(12) United States Patent
Heukelom et al.

(10) Patent No.: US 11,636,431 B2
(45) Date of Patent: Apr. 25, 2023

(54) SYSTEMS AND METHODS FOR DYNAMIC ASSIGNMENT, MONITORING AND MANAGEMENT OF DISCRETE TASKS

(71) Applicant: AppExtremes, LLC, Broomfield, CO (US)

(72) Inventors: Josh Van Heukelom, Urbandale, IA (US); Sayer P. Martin, West Des Moines, IA (US); Blake Evan Rozendaal, Urbandale, IA (US)

(73) Assignee: AppExtremes, LLC, Broomfield, CO (US)

( * ) Notice: Subject to any disclaimer, the term of this patent is extended or adjusted under 35 U.S.C. 154(b) by 112 days.

(21) Appl. No.: 16/733,963

(22) Filed: Jan. 3, 2020

(65) Prior Publication Data

US 2020/0250622 A1    Aug. 6, 2020

Related U.S. Application Data

(60) Provisional application No. 62/788,246, filed on Jan. 4, 2019.

(51) Int. Cl.
*G06Q 10/10* (2023.01)
*G06Q 30/01* (2023.01)

(52) U.S. Cl.
CPC .......... *G06Q 10/103* (2013.01); *G06Q 30/01* (2013.01)

(58) Field of Classification Search
None
See application file for complete search history.

(56) References Cited

U.S. PATENT DOCUMENTS

| | | |
|---|---|---|
| 6,289,460 B1 | 9/2001 | Hajmiragha |
| 6,298,342 B1 | 10/2001 | Graefe |
| 6,944,648 B2 | 9/2005 | Cochran et al. |
| 7,278,168 B1 | 10/2007 | Chaudhury et al. |
| 7,315,947 B2 | 1/2008 | Pravetz et al. |
| 7,353,397 B1 | 4/2008 | Herbach |
| 7,370,206 B1 | 5/2008 | Goldman |
| 7,395,503 B1 | 7/2008 | Pravetz |
| 7,406,599 B1 | 7/2008 | Pravetz et al. |
| 7,434,048 B1 | 10/2008 | Shapiro et al. |
| 7,581,106 B1 | 8/2009 | Das et al. |
| 7,660,981 B1 | 2/2010 | Hunt |
| 7,694,145 B1 | 4/2010 | Pravetz et al. |
| 7,698,559 B1 | 4/2010 | Chaudhury et al. |

(Continued)

OTHER PUBLICATIONS

Lee, S. G., K. L. Ong, and Li Pheng Khoo. "Control and monitoring of concurrent design tasks in a dynamic environment." Concurrent Engineering 12.1 (2004): 59-66.*

(Continued)

*Primary Examiner* — Peter Ludwig
*Assistant Examiner* — Donald J Edmonds
(74) *Attorney, Agent, or Firm* — FisherBroyles LLP; Ian R. Walsworth

(57) ABSTRACT

Systems for assigning, monitoring, managing and completing tasks and other activities through a customer-relationship management or other data repository are disclosed in the present application. A variety of novel user interfaces and graphical overlays are also disclosed and within the scope of the present disclosure. Methods for assigning, monitoring, managing and completing tasks are also disclosed.

12 Claims, 14 Drawing Sheets

(56) References Cited

U.S. PATENT DOCUMENTS

| | | |
|---|---|---|
| 7,707,642 B1 | 4/2010 | Herbach et al. |
| 7,735,144 B2 | 6/2010 | Pravetz et al. |
| 7,770,015 B1 | 8/2010 | Goldman et al. |
| 7,774,608 B2 | 8/2010 | Pravetz et al. |
| 7,840,802 B1 | 11/2010 | Shapiro et al. |
| 7,895,166 B2 | 2/2011 | Foygel et al. |
| 7,900,132 B2 | 3/2011 | Matveief et al. |
| 7,996,367 B2 | 8/2011 | Foygel et al. |
| 7,996,439 B2 | 8/2011 | Foygel et al. |
| 8,024,561 B1 | 9/2011 | Das et al. |
| 8,145,909 B1 | 3/2012 | Agrawal et al. |
| 8,151,114 B2 | 4/2012 | Chaudhury et al. |
| 8,166,393 B1 | 4/2012 | Pravetz |
| 8,185,741 B1 | 5/2012 | Agrawal et al. |
| 8,239,496 B2 | 8/2012 | Peterson et al. |
| 8,261,082 B1 | 9/2012 | Goldman |
| 8,275,993 B2 | 9/2012 | Pravetz et al. |
| 8,359,473 B1 | 1/2013 | Sorotokin et al. |
| 8,522,240 B1* | 8/2013 | Merwarth ............ G06Q 10/103 718/100 |
| 8,539,004 B2 | 9/2013 | Foygel et al. |
| 8,583,705 B2 | 11/2013 | Foygel et al. |
| 8,620,953 B2 | 12/2013 | Foygel et al. |
| 8,621,222 B1 | 12/2013 | Das |
| 8,627,269 B2 | 1/2014 | Malasky et al. |
| 8,635,442 B2 | 1/2014 | Agrawal |
| 8,655,961 B2 | 2/2014 | McCabe et al. |
| 8,683,605 B1 | 3/2014 | Tenenboym et al. |
| 8,688,997 B2 | 4/2014 | Das et al. |
| 8,713,322 B2 | 4/2014 | Pravetz et al. |
| 8,793,193 B2 | 7/2014 | Sorotokin et al. |
| 8,793,492 B2 | 7/2014 | Shah et al. |
| 8,806,193 B2 | 8/2014 | Swaminathan et al. |
| 8,832,047 B2 | 9/2014 | Herbach et al. |
| 8,838,980 B2 | 9/2014 | Gonser et al. |
| 8,844,055 B2 | 9/2014 | Follis et al. |
| 8,868,916 B2 | 10/2014 | Shapiro |
| 8,874,923 B2 | 10/2014 | Foygel |
| 8,910,258 B2 | 12/2014 | Gonser et al. |
| 8,914,639 B2 | 12/2014 | Hogan |
| 8,949,706 B2 | 2/2015 | McCabe et al. |
| 8,949,708 B2 | 2/2015 | Peterson et al. |
| 8,954,731 B2 | 2/2015 | Tenenboym et al. |
| 9,009,477 B2 | 4/2015 | Das |
| 9,058,506 B2 | 6/2015 | Pravetz |
| 9,158,750 B2 | 10/2015 | Matveief et al. |
| 9,178,707 B2 | 11/2015 | Foygel |
| 9,219,753 B2 | 12/2015 | Fleischman et al. |
| 9,230,130 B2 | 1/2016 | Peterson et al. |
| 9,251,131 B2 | 2/2016 | McCabe et al. |
| 9,253,206 B1 | 2/2016 | Fleischman |
| 9,268,758 B2 | 2/2016 | Gonser et al. |
| 9,276,749 B2 | 3/2016 | Tenenboym et al. |
| 9,292,876 B1 | 3/2016 | Shimkus |
| 9,323,937 B2 | 4/2016 | Follis et al. |
| 9,344,424 B2 | 5/2016 | Tenenboym et al. |
| 9,384,178 B2 | 7/2016 | Nydam et al. |
| 9,411,971 B2 | 8/2016 | Follis |
| 9,432,368 B1 | 8/2016 | Saxena et al. |
| 9,514,117 B2 | 12/2016 | Gonser |
| 9,521,001 B2 | 12/2016 | Follis et al. |
| 9,544,149 B2 | 1/2017 | Follis |
| 9,613,016 B2 | 4/2017 | Pravetz |
| 9,614,681 B2 | 4/2017 | Follis et al. |
| 9,626,653 B2 | 4/2017 | Saxena et al. |
| 9,628,462 B2 | 4/2017 | Gonser et al. |
| 9,634,975 B2 | 4/2017 | McCabe et al. |
| 9,692,601 B2 | 6/2017 | Follis |
| 9,703,982 B2 | 7/2017 | Kumar et al. |
| 9,727,522 B1 | 8/2017 | Barber |
| 9,736,127 B2 | 8/2017 | Fleischman et al. |
| 9,742,746 B2 | 8/2017 | Fleischman et al. |
| 9,768,965 B2 | 9/2017 | Tenenboym et al. |
| 9,798,709 B2 | 10/2017 | Malden |
| 9,798,710 B2 | 10/2017 | McCabe et al. |
| 9,800,556 B2 | 10/2017 | Steeves |
| 9,818,138 B2 | 11/2017 | Shimkus |
| 9,824,198 B2 | 11/2017 | Carroll et al. |
| 9,842,095 B2 | 12/2017 | Kumar et al. |
| 9,842,201 B2 | 12/2017 | Follis et al. |
| 9,882,725 B2 | 1/2018 | Foygel |
| 9,893,895 B2 | 2/2018 | Peterson et al. |
| 10,482,391 B1 | 11/2019 | Lynch |
| 2003/0023622 A1 | 1/2003 | Obermeyer |
| 2004/0205448 A1 | 10/2004 | Grefenstette |
| 2004/0225718 A1 | 11/2004 | Heinzel |
| 2005/0015377 A1 | 1/2005 | Wan |
| 2006/0173876 A1 | 8/2006 | Kihneman |
| 2006/0235732 A1* | 10/2006 | Miller .................... G06Q 10/10 705/7.23 |
| 2007/0185935 A1 | 8/2007 | Olivieri |
| 2007/0239514 A1 | 10/2007 | Lissy et al. |
| 2008/0229313 A1* | 9/2008 | Motoyama ............. G06Q 10/06 718/102 |
| 2009/0150429 A1 | 6/2009 | Yamamoto |
| 2009/0182824 A1 | 7/2009 | Haynes et al. |
| 2009/0204470 A1* | 8/2009 | Weyl ...................... G06Q 10/06 705/7.13 |
| 2009/0204471 A1 | 8/2009 | Elenbaas et al. |
| 2010/0262653 A1* | 10/2010 | Chaffee .................. G06Q 10/10 715/853 |
| 2011/0043652 A1 | 2/2011 | King |
| 2011/0145805 A1* | 6/2011 | Taylor ................... G06Q 30/02 717/168 |
| 2011/0191417 A1 | 8/2011 | Rathod |
| 2011/0238437 A1 | 9/2011 | Zhou |
| 2012/0158865 A1* | 6/2012 | Kurian ............ G06Q 10/06311 709/206 |
| 2012/0278117 A1* | 11/2012 | Nguyen ........... G06Q 10/06313 705/7.15 |
| 2013/0050512 A1 | 2/2013 | Gonser et al. |
| 2013/0191836 A1* | 7/2013 | Meyer .................... G06F 9/4881 718/103 |
| 2013/0254111 A1 | 9/2013 | Gonser et al. |
| 2013/0283211 A1* | 10/2013 | Malkin .................. G06Q 10/06 715/844 |
| 2014/0032529 A1 | 1/2014 | Chang |
| 2014/0108083 A1* | 4/2014 | Nguyen ........... G06Q 10/06313 705/7.17 |
| 2014/0207731 A1 | 7/2014 | Mack |
| 2014/0279838 A1 | 9/2014 | Tsirogiannis et al. |
| 2014/0281967 A1* | 9/2014 | Bodnick ............... G06F 3/0484 715/708 |
| 2014/0304518 A1 | 10/2014 | Gonser et al. |
| 2014/0350966 A1 | 11/2014 | Khatana et al. |
| 2015/0067464 A1 | 3/2015 | McCabe et al. |
| 2015/0134391 A1* | 5/2015 | Gordon .......... G06Q 10/063118 705/7.17 |
| 2015/0143218 A1 | 5/2015 | Peterson et al. |
| 2015/0180833 A1 | 6/2015 | Snow |
| 2015/0248484 A1 | 9/2015 | Yu |
| 2015/0317295 A1 | 11/2015 | Sherry |
| 2015/0317595 A1* | 11/2015 | De ....................... G06F 9/4887 705/7.15 |
| 2016/0140101 A1 | 5/2016 | Gosner, Jr. et al. |
| 2016/0182560 A1 | 6/2016 | Fleischman |
| 2016/0224526 A1 | 8/2016 | Gazit et al. |
| 2016/0226829 A1 | 8/2016 | Steeves et al. |
| 2016/0239471 A1 | 8/2016 | Shimkus |
| 2016/0378629 A1 | 12/2016 | Gwozdz et al. |
| 2017/0103407 A1* | 4/2017 | Teevan ................ G06Q 30/0208 |
| 2017/0223022 A1 | 8/2017 | Peterson et al. |
| 2017/0223093 A1 | 8/2017 | Peterson et al. |
| 2017/0329984 A1 | 11/2017 | Clough |
| 2017/0353314 A1 | 12/2017 | Steeves et al. |
| 2017/0353445 A1 | 12/2017 | Steeves et al. |
| 2017/0374048 A1 | 12/2017 | Fleischman et al. |
| 2018/0018610 A1* | 1/2018 | Del Balso ................ G06N 3/08 |
| 2018/0046655 A1 | 2/2018 | Ward |
| 2018/0067976 A1 | 3/2018 | Schoppe |
| 2018/0096027 A1 | 4/2018 | Romero |

(56) References Cited

U.S. PATENT DOCUMENTS

2018/0152407 A1* 5/2018 Soni .................... G06Q 10/103
2019/0034592 A1   1/2019 Gupta
2019/0197043 A1   6/2019 Rajendran

OTHER PUBLICATIONS

Zhang et al., Research and Implementation for Data Synchronization of Heterogeneous Databases, IEEE 2010, pp. 1-7, (Year: 2010),.
International Search Report and Written Opinion from related PCT/US20/12230. dated Jun. 5, 2020. 9 pages.
International Preliminary Report on Patentability from PCT/US18/061513. dated Jun. 2, 2020. 6 Pages.

* cited by examiner

FIG. 1

SYSTEMS AND METHODS FOR DYNAMIC ASSIGNMENT, MONITORING AND MANAGEMENT OF DISCRETE TASKS

CROSS-REFERENCE TO RELATED APPLICATIONS

This application claims priority, pursuant to 35 U.S.C. § 119(e), to U.S. Provisional Application No. 62/788,246 filed on Jan. 4, 2019, which is incorporated by reference herein in its entirety.

FIELD OF THE INVENTION

The present invention is generally directed to systems and methods for enhanced assignment, monitoring and management of tasks and/or other activities, including through a customer-relationship management or other data repository.

COPYRIGHT NOTICE

A portion of this disclosure is subject to copyright protection. Limited permission is granted to facsimile reproduction of the patent document or patent disclosure as it appears in the U.S. Patent and Trademark Office (USPTO) patent file or records. The copyright owner reserves all other copyright rights whatsoever.

BACKGROUND

Commercial and/or work-related tasks and activities are increasingly complex, long-running and multi-faceted in today's business environments. Completing a discrete task often involves numerous individuals, sometimes spanning multiple organizations, accessing and manipulating one or more secure data sources, controlled sequencing and/or timeliness of sub-processes, monitoring and/or rerouting activities to maintain critical path requirements, etc. These environments and obstacles create challenges when assigning and managing discrete tasks across one or several large organizations and/or multiple individuals.

Certain of these tasks may be facilitated through the use of a Customer Relationship Management (CRM) system, such as Salesforce. However, CRM users frequently create and manage tasks and other activities outside of a CRM environment, which limits the efficiency and management of those discrete tasks, particularly where several individual users are involved. In addition, current CRM systems have shortcomings with respect to managing tasks and activities and/or modifying/approving/rejecting certain tasks or subtasks within the CRM environment. Presently, CRM systems lack an efficient way to monitor tasks and activities involving multiple users, or to observe the status of activities as they are in process for facilitating timely completion of the activities by individual users.

There are a number of additional shortcomings in prior art systems and methods for assigning, managing and completing tasks and other activities through a CRM or equivalent system, which have not been adequately addressed or resolved by the prior art. It is with respect to these shortcomings and other issues identified herein presently faced by those of skill in the pertinent art that embodiments of the present disclosure were contemplated.

SUMMARY

U.S. patent application Ser. No. 15/826,026, filed on Nov. 29, 2017 and Ser. No. 16/137,193, filed on Sep. 20, 2018 are hereby incorporated by reference in their entireties for the purpose of supplementing this disclosure, pursuant to 35 U.S.C. § 112.

In view of the shortcomings and problems in the prior art, it is one aspect of the present disclosure to provide a user with a system and method to assign, monitor, manage and complete tasks or steps among multiple individuals or organizations, which may be assigned to one or more users through a novel overlay.

In embodiments, one or more rules, conditions, validations, approvals (or rejections) and various interrelationships between tasks or steps may be configured using the systems and methods described herein.

In embodiments, the system and method may involve assignment of tasks or steps associated with a CRM system, which a user(s) may access. In embodiments, assigned tasks or steps are specific to a particular record contained in a CRM system.

In embodiments, the systems and methods may be record-specific, wherein a record may be a corporate, legal, commercial, financial or business or organization-related document. In embodiments, the record may require multiple discrete tasks or activities to complete and may further require access to the record several times by several different individual users.

It is yet another aspect to provide a system and method for assigning tasks, using Salesforce objects and views, and to monitor and manage those tasks across an enterprise or organization.

According to yet another aspect, the present disclosure relates to methods of organizing and managing completion of tasks through a customer relationship management system, which may comprise one or more of the following steps: providing an interface to a user for managing one or more tasks; creating a task using the interface; assigning the task to at least one user; associating one or more subtasks for the assigned task; communicating the assigned task and one or more subtasks to the at least one user; assigning an approval for completion of the task to at least one other user; providing one or more indicia representing the state of the assigned task via the interface; communicating the completion of each of the one or more subtasks associated with the assigned task to the at least one other user; soliciting an approval or rejection of the assigned task from the at least one other user; and reporting the approval or rejection of the assigned task.

According to yet another embodiment, the present disclosure relates to a method of monitoring and reporting event instances, comprising one or more of the following steps: building a step object; publishing an event associated with the step object; storing published events in a repository; receiving a subscribed event message from a publisher; filtering events based on event type; gathering information for formatting a request to poll events; executing a process for filtered event polling; polling event instances for each requested event type; retrieving data reflecting a change in status for each of the event instances polled; and communicating the retrieved data to the subscriber.

In embodiments, the steps of the methods described herein are performed using a computational machine specifically configured to organize and manage the various steps.

The Summary is neither intended nor should it be construed as being representative of the full extent and scope of the present invention. The present invention is set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the detailed description.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "machine-readable media" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a flexible disk, hard disk, magnetic tape, or any other magnetic medium, magneto-optical medium, a CD-ROM, any other optical medium, a RAM, a PROM, an EPROM, a FLASH-EPROM, a solid state medium like a memory card, any other memory chip or cartridge, or any other medium from which a computer or like machine can read.

When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute", and variations thereof, as used herein, are used interchangeably and include any type of methodology, process, mathematical operation or technique.

The term "module" as used herein refers to any known or later developed hardware, software, firmware, machine engine, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

The term "publisher" as used herein means a user or member who creates, sends, publishes or otherwise makes available certain data or other information accessible via the system. For example, a publisher may publish an event via the system that is accessible to a class of subscribers without directing messaging to any specific subscriber.

The term "subscriber" as used herein means a user or member who accesses or subscribes to certain data or other information accessible via the system. For example, a subscriber may receive access to events that have been published by other users or members without knowledge of the publisher, and may subscribe to multiple events in this manner.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosure.

In the drawings:

Figure 1:
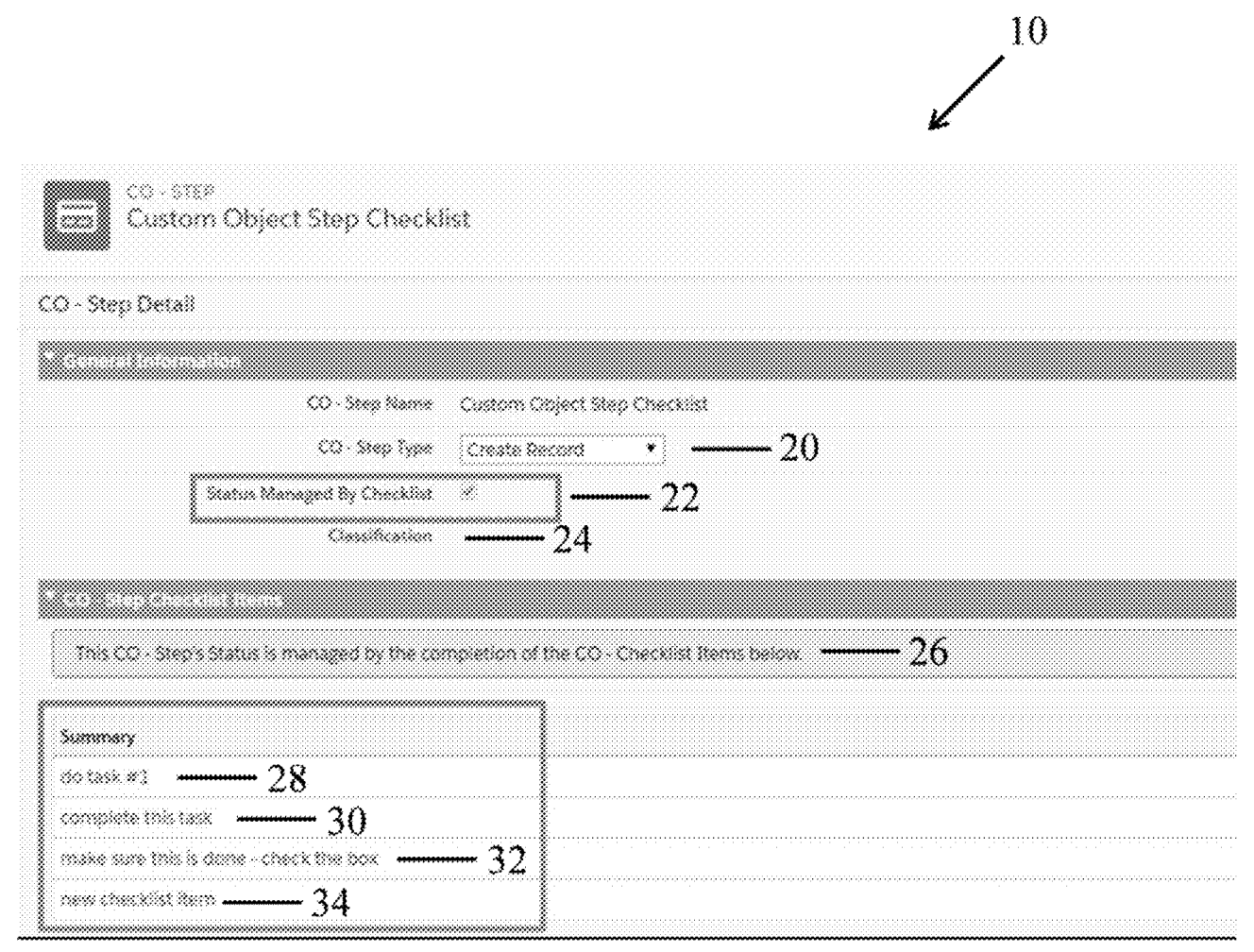

FIG. 1 illustrates an overlay for creating a discrete task checklist according to one embodiment of the present disclosure;

Figure 2:
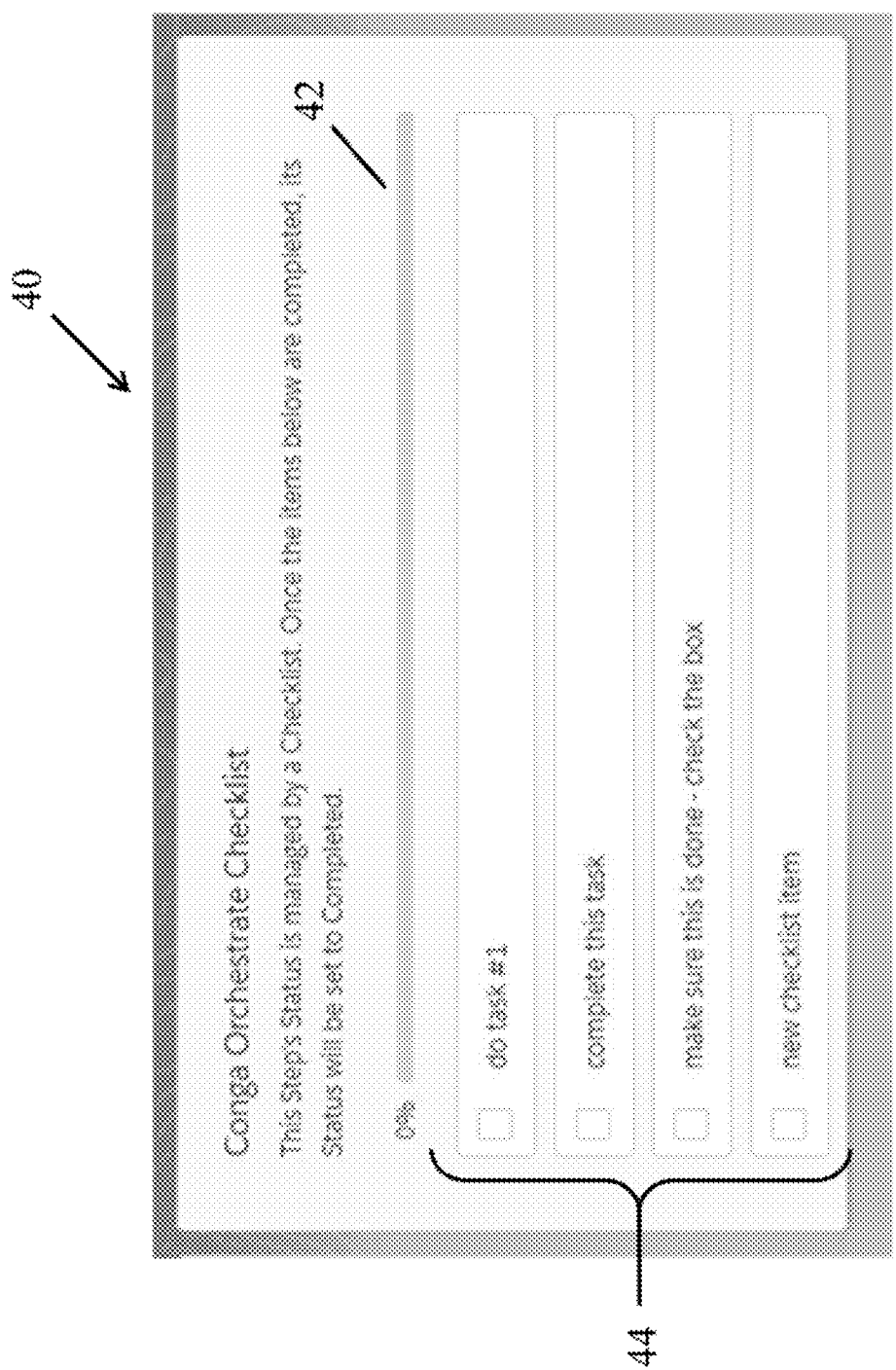
FIG. 2 illustrates a display for monitoring and managing the tasks assigned in the embodiment of FIG. 1.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present disclosure relates to systems and methods for dynamically assigning, monitoring, managing and completing tasks or steps among multiple individuals or organizations. In the embodiments described herein, one or more tasks or steps may be assigned to users through a novel overlay. The tasks or steps may be associated with a CRM system, which the users may access. In other embodiments, one or more rules, conditions, validations, approvals (or rejections) and various interrelationships between tasks or steps may be configured using the systems and methods described herein. Certain embodiments relate to tasks or steps that are specific to a particular record contained in, for example, a CRM system. Numerous novel displays are included in the present disclosure. Other novel aspects of the systems and methods disclosed herein will be better understood after reviewing the Summary and Detailed Description.

The present disclosure illustrates embodiments only, and is not intended to limit the scope, applicability, or configuration of the claimed invention. Rather, the ensuing description will provide those skilled in the art with an enabling description for implementing the embodiments. It should be understood that various changes may be made in the function and arrangement of elements without departing from the spirit and scope of the appended claims.

In view of the foregoing, various embodiments of the present disclosure will now be described in detail. The ensuing description provides embodiments only, and is not intended to limit the scope, applicability, or configuration of the claimed invention. Rather, the ensuing description will provide those skilled in the art with an enabling description for implementing the embodiments, and that various changes may be made in the function and arrangement of elements without departing from the spirit and scope of the appended claims.

Referring to FIGS. 1-12, various displays and user interfaces 10, 40, 50, 70, 100 corresponding to the embodiments of the present disclosure are illustrated. As shown in FIG. 1, an administrator or other user of the system may create and assign one or more tasks or "steps" using the interface 10. The user may be presented with the ability to name and describe 26 each task or step and select, for example, a step type 20. In addition, the user may choose the style of managing status of the created and assigned step(s), such as through a dynamic checklist 22, and may further classify the step 24 according to one or more predefined classifications. Multiple steps 28, 30, 32 in the checklist may be assigned to a single user, and multiple steps 28, 30, 32 may be assigned. Different users may receive instructions to complete a task or step 28, 30, and in some instances approve a step 32. In certain embodiments a step may be conditioned on the completion or approval of a preceding step or task. In this manner, tasks or steps may be sequential and arranged in series. Other tasks or steps may proceed in parallel, especially when assigned to different users.

The step checklist of FIG. 1 is preferably provided as an overlay to a CRM system. This overlay permits, for example, a user to assign Salesforce tasks, using Salesforce objects and views, to monitor and manage those tasks across an enterprise or organization. Alternatively, a pop-over user interface may be provided in lieu of or in addition to the interface and/or overlay of FIG. 1.

The overlay preferably comprises one or more fields, including details or a summary of the particular task(s) assigned to a user. The fields may provide a user with specific information relating to the timing or importance of a task assigned to the user, or information regarding successive tasks. The overlay may comprise a status display or dashboard (not shown in FIG. 1) for tracking the progress of task completion and/or removal of tasks as they are completed from the checklist.

Referring now to FIG. 2, another interface 40 is shown for displaying the status of tasks or steps assigned. A progress bar 42 or equivalent may be provided with this interface 40 for visually depicting the state or status of various tasks. In addition, a checklist 44 may also be provided as shown in FIG. 2, wherein the user or the system automatically marks items in the checklist 44 as completed at an appropriate stage.

Figure 3:
FIG. 3 illustrates another embodiment for assigning an approval step to a user.

Another embodiment is shown in FIG. 3, which depicts an interface 50 for assigning a user with the ability to approve (or reject) a discrete task or step in a process. The step name 46 and type 48 may be selected by a user and classified 49 if desired, then assigned to the appropriate personnel. Once a user receives this type of approval task 54, the user must either approve 56 or reject 58 the items assigned. If accepted 56, additional steps may be performed as authorized by the approval, or the approval may designate the ultimate completion of the checklist. In embodiments, the approval may indicate completion of a step, and/or be configured to result in completion of a step, or may initiate additional steps (which in turn contain additional checklists). If rejected 58, the process may either terminate and stop the process 60, or alternatively proceed to an earlier stage (such as by looping or repeating preceding steps). The user may subsequently receive a second opportunity to approve after other steps or tasks have been reperformed.

The steps described herein may be assigned as conditional to obtain approval, thereby notifying other users of the need to complete these tasks in order to reach the assigned goal and complete the step. Certain steps are completed only after an approval decision is obtained. In certain embodiments, the novel overlay provides the user with the ability to make certain steps conditional.

In certain embodiments, a user may include one or more intermediate steps in order to grant approval. In other embodiments, steps may be interjected into an existing checklist or through a new checklist.

Figure 4:
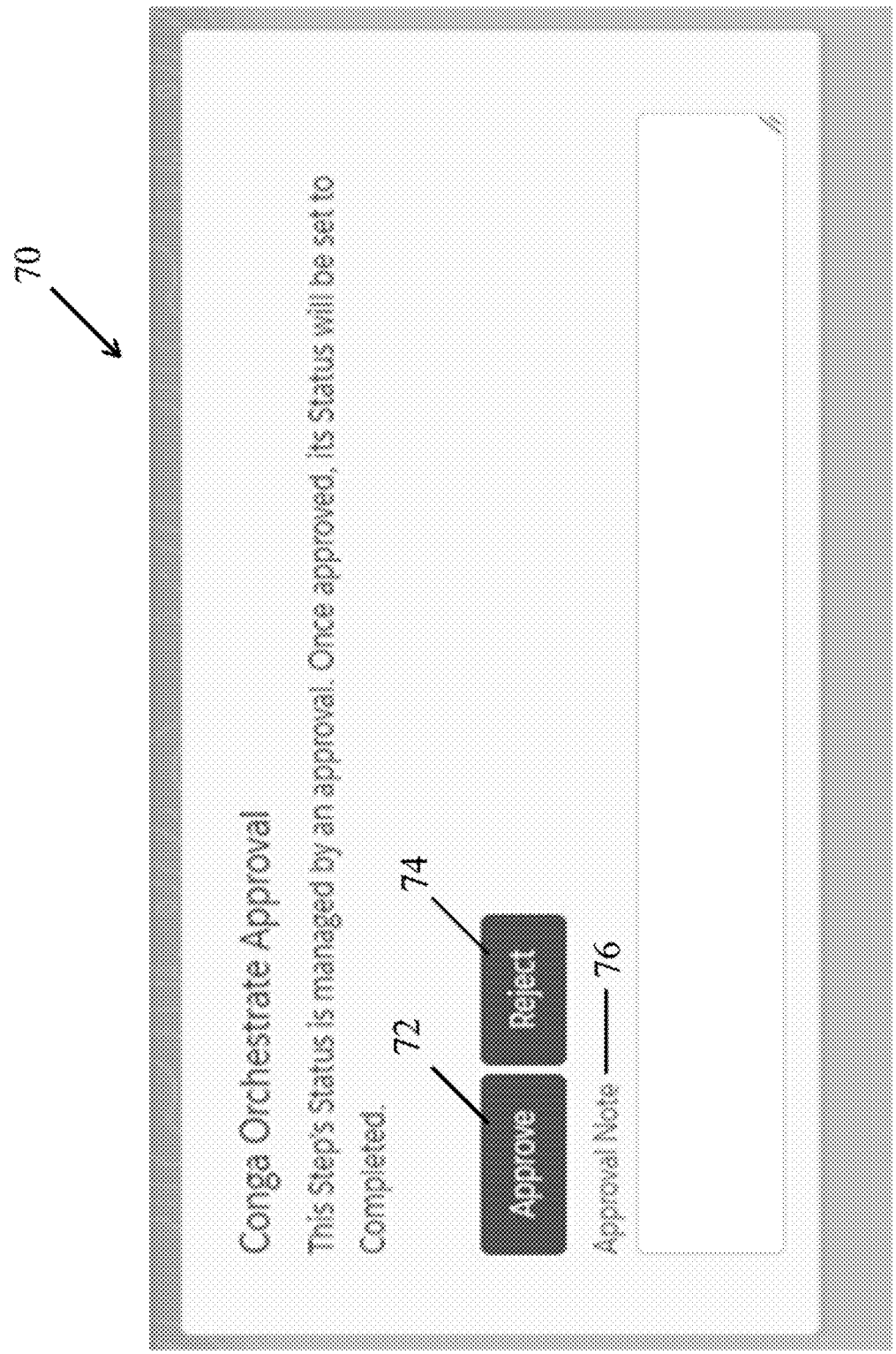
FIG. 4 illustrates additional aspects of the embodiment illustrated in FIG. 3.

FIG. 4 illustrates another interface 70 illustrating additional aspects of the approval/rejection process described above. The user assigned with this approval/rejection step may be provided with the interface 70 and the opportunity to make the user's selection (by way of example, Approve 72 or Reject 74) and, if desired, include notes 76 on the selection. Instructions may be provided with the interface 70 as well, further guiding the approver of the urgency or importance of the approval process.

In certain embodiments, the assignment and management of tasks or steps may be specific to a certain record. The record may be any record contained in the CRM system. For example, the record may be a contract and clause within a contract. In this example, the tasks or steps may comprise discrete activities needed from one or more users to negotiate and/or finalize the contract or clause. Here, multiple steps and step types may be assigned across CRM (i.e. Salesforce) objects, wherein those objects are uniquely tied to the underlying data in the CRM system. This permits data within Salesforce (or other CRM) to be dynamically modified and updated as the steps are completed. In addition, this permits reporting functionality (in Salesforce or other CRM systems) to reflect the status of steps assigned relative to the record.

Figure 5:
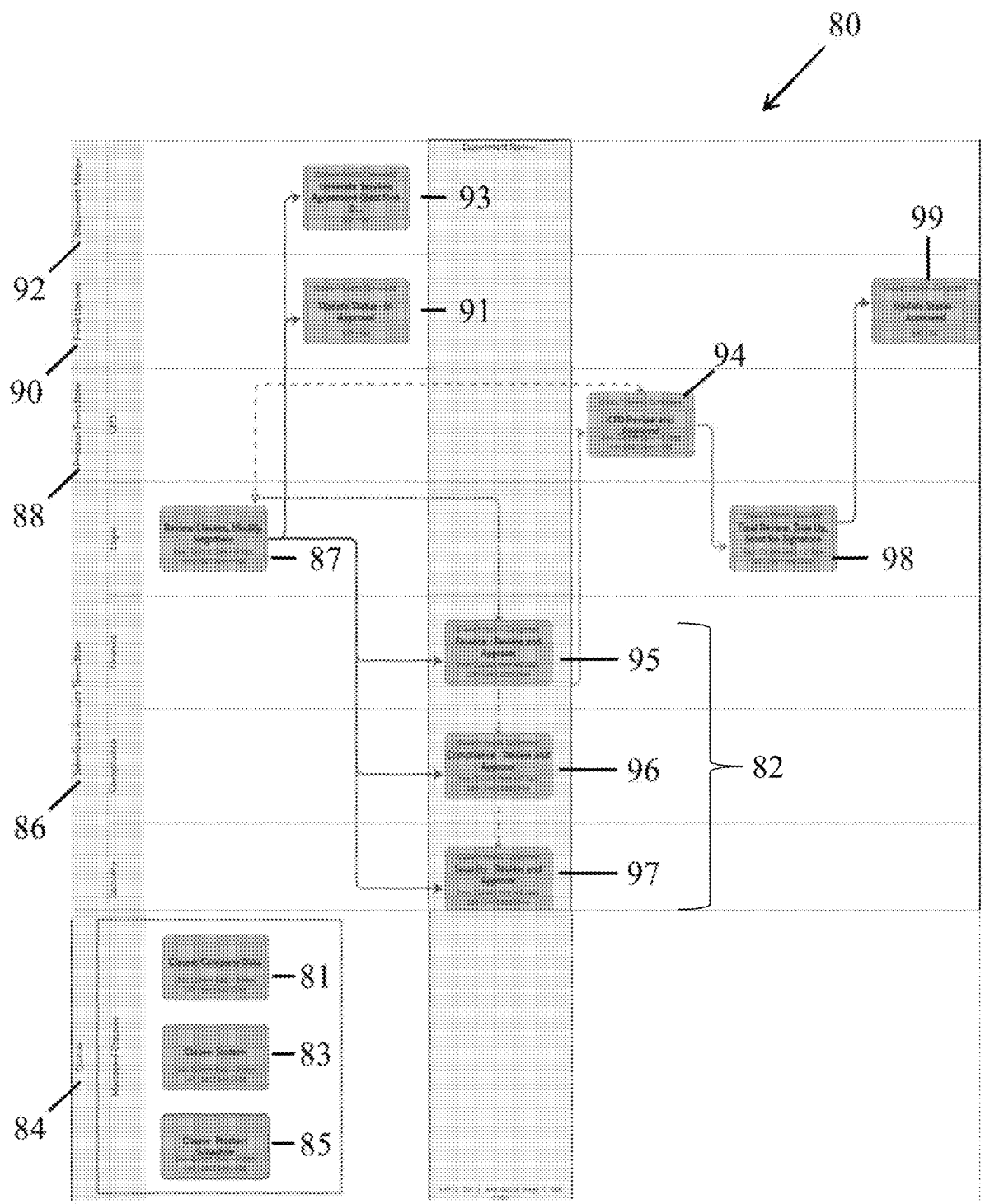
FIG. 5 illustrates a tabular display according to one embodiment that comprises multi-level tasks and stages.

FIG. 5 depicts a table 80 showing the steps or tasks assigned to users with different roles or titles within the organization. For example, certain tasks may be assigned to "security", "compliance", "finance", "legal" (identified as 140 in FIG. 8) or other roles and/or departments within the organization. In addition, certain tasks 87 may be primary tasks and have "child" tasks 91, 93, 95, 96, 97 associated therewith. In FIG. 5, these child tasks 91, 93, 95, 96, 97 may be easily identified based on their relationship (i.e., dependence) with a primary task 87. Clusters of tasks 82 may also be classified on this table. For example, a departmental review occurring once certain key tasks 95, 96, 97 are completed may be assigned to certain users as a predicate before further tasks can begin. Other tasks or steps may be looped or repeated, as shown by the dashed line between steps 94 and 87 in FIG. 5. Further details regarding looping and repeating are provided below.

Figure 6:
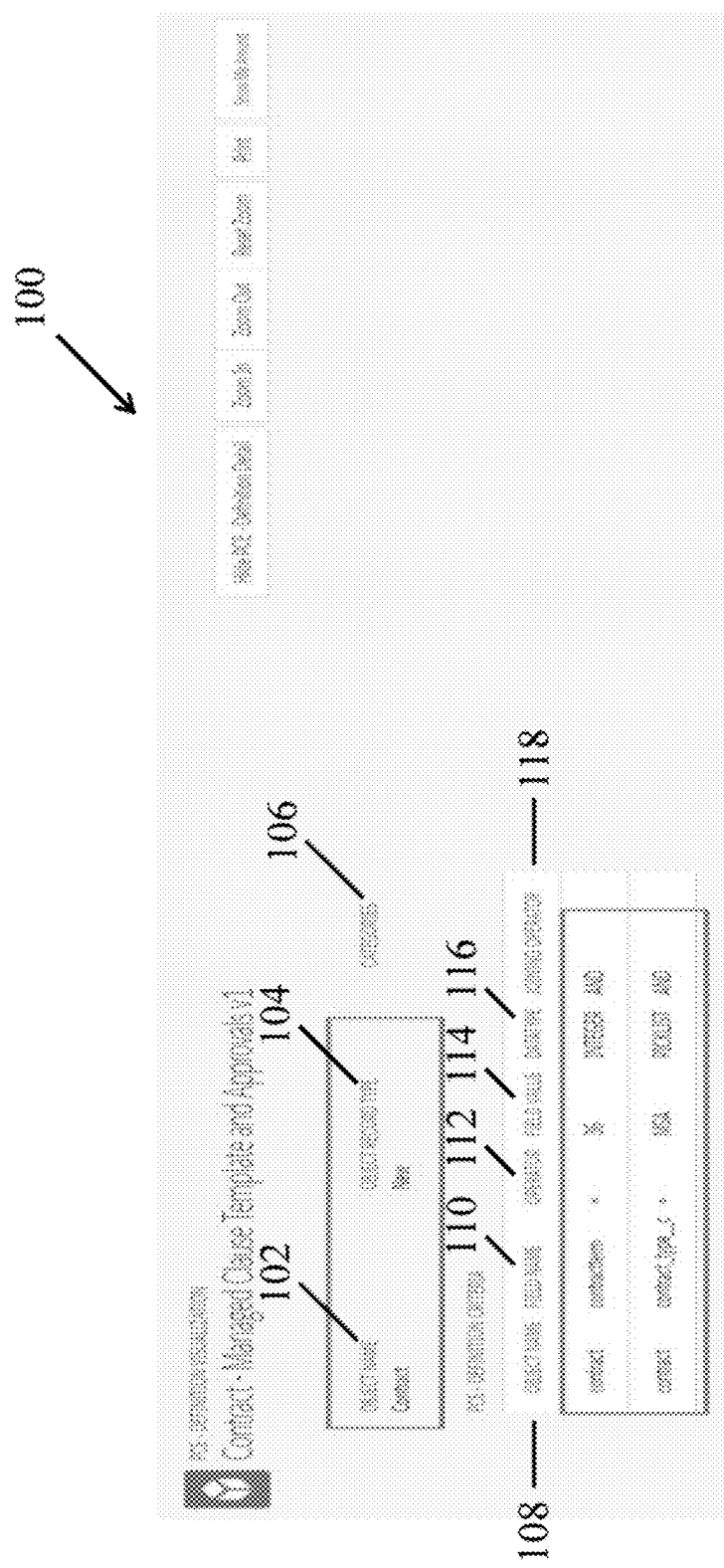
FIG. 6 illustrates another embodiment relating to a record-specific task assignment.

As shown in FIG. 5, certain tasks or steps 81, 83, 85 may be placed in queue 84, but currently are not assigned to any particular user (for example, Salesforce Account Team Roles 86 or Process Team Roles 88). The queued tasks or steps may be assigned to particular users at a later time. The table may further comprise various indicia, coloring, icons (for example, Field Update 90 or Document Merge 92) or similar to indicate the status of the tasks reflected therein. FIG. 6 shows an interface 100 for creating a record-specific approval task and assigning that task to a user. Variations on the interface 100 shown in FIG. 6 are considered within the scope of the present disclosure. In FIG. 6, an approval process may entail selecting and/or linking an Object Name 102, Object Record Type 104 and Categories 106 for the specific object or record. More detailed criteria may also be selected and/or linked using this interface 100, including but not limited to Object Name 108, Field Name 110, Operator 112, Field Value 114, Datatype 116 and Joining Operator 118. In alternate embodiments, certain tasks may be displayed as recommendations of tasks that could be assigned for a certain activity or to a specific user (or type/class of user).

Accordingly, the interfaces 10, 40, 50, 70, 100 of FIGS. 1-6 provide a user with the ability to quickly view and manage tasks associated with objects or records within a CRM. Furthermore, the system according to this embodiment allows a user to update or modify a process, which can help avoid errors and delays when completing tasks across multiple individuals or groups. Alternatively, the user may update the objects and/or fields associated with a record, including by adding, removing or altering a previous selection, thereby influencing the process of steps. This may be helpful when a particular object and/or field within Salesforce or equivalent CRM has experienced a fundamental change that is necessary for the user(s) to appreciate when completing their assigned tasks or steps. Thus, the system provides a user with the ability to dynamically and efficiently identify users for assigning tasks, to associate those tasks with Salesforce objects, and manage the completion of tasks across the enterprise.

Figure 7A:
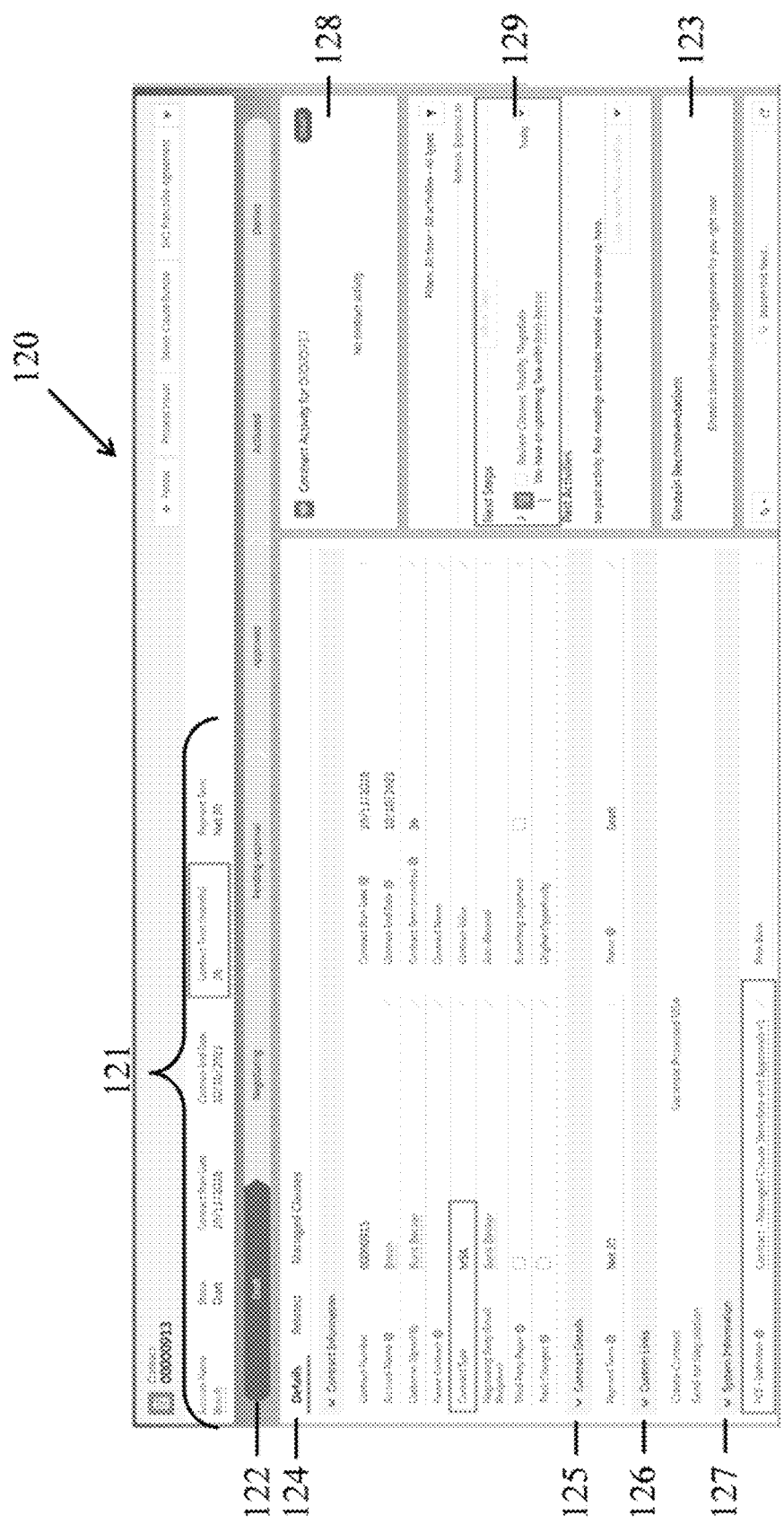
FIGS. 7A-7B illustrate overlays for a record-specific task according to the embodiment of FIG. 6.
Figure 7B:
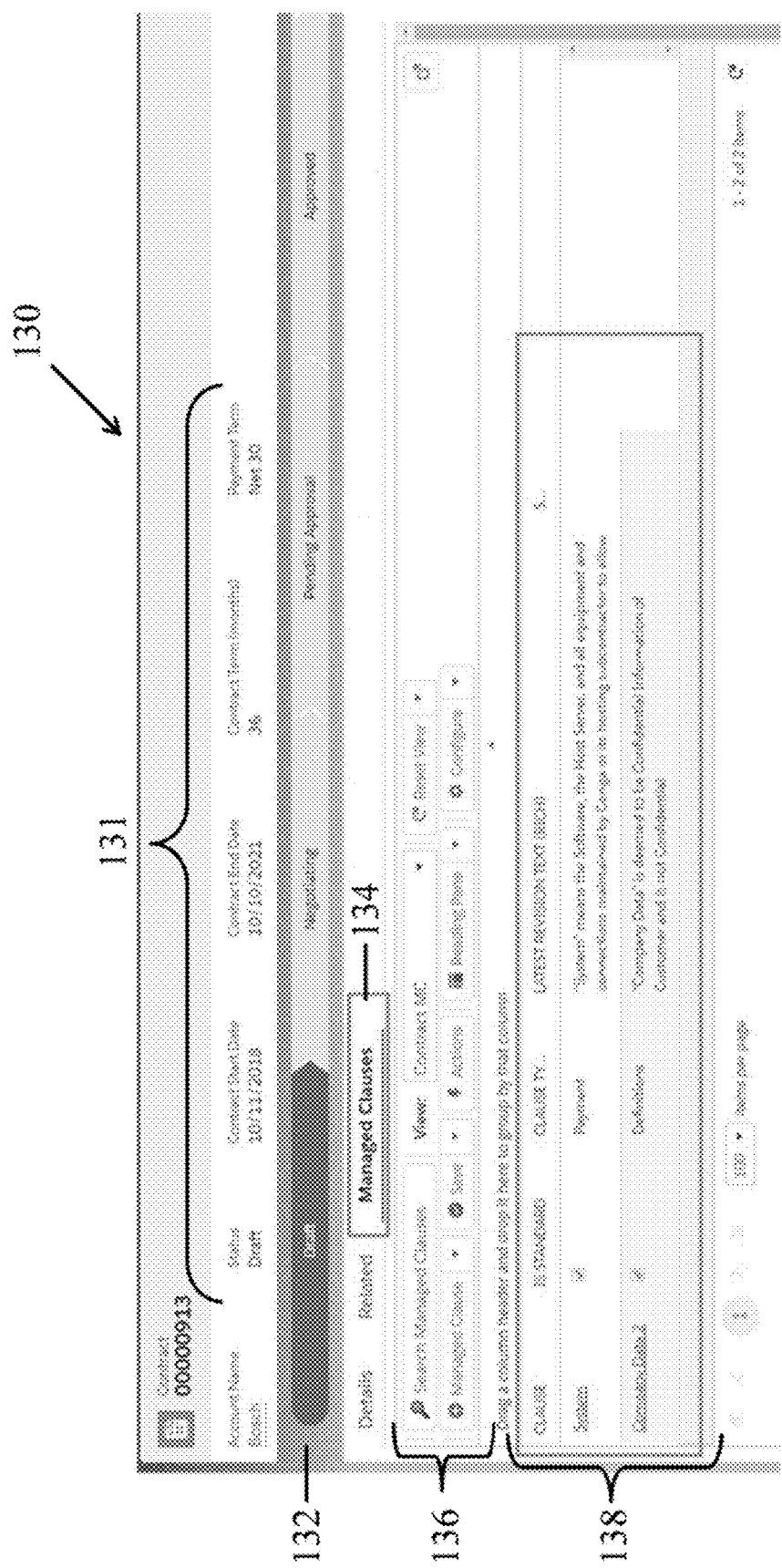

Referring now to FIGS. 7A-7B, two additional displays are shown. A task may appear in a dashboard 120 on one portion of the display and provide information concerning past actions taken and/or next steps 129 requiring completion. Recent activity 128 may be called out to the user, or recommendations 123 made by the system for completing or redirecting an assigned task. The dashboard 120 may also summarize or otherwise contain record-specific details 121 or the status on a status bar 122 as shown in FIG. 7A. Details 124, such as Contract Details 125, Custom Links 126 and System Information 127 may also be displayed via the dashboard 120.

FIG. 7A depicts a display showing contract details associated with a single task. FIG. 7B depicts a dashboard 130 comprising an exemplary list of clauses 138, which may in turn be created automatically as steps. A status table or bar 132 may also be provided, which shows the user what steps are necessary to complete the assigned tasks. The user may be provided with options or toolbars 136 via the interface of FIG. 7B, in addition to those described above.

Figure 8:
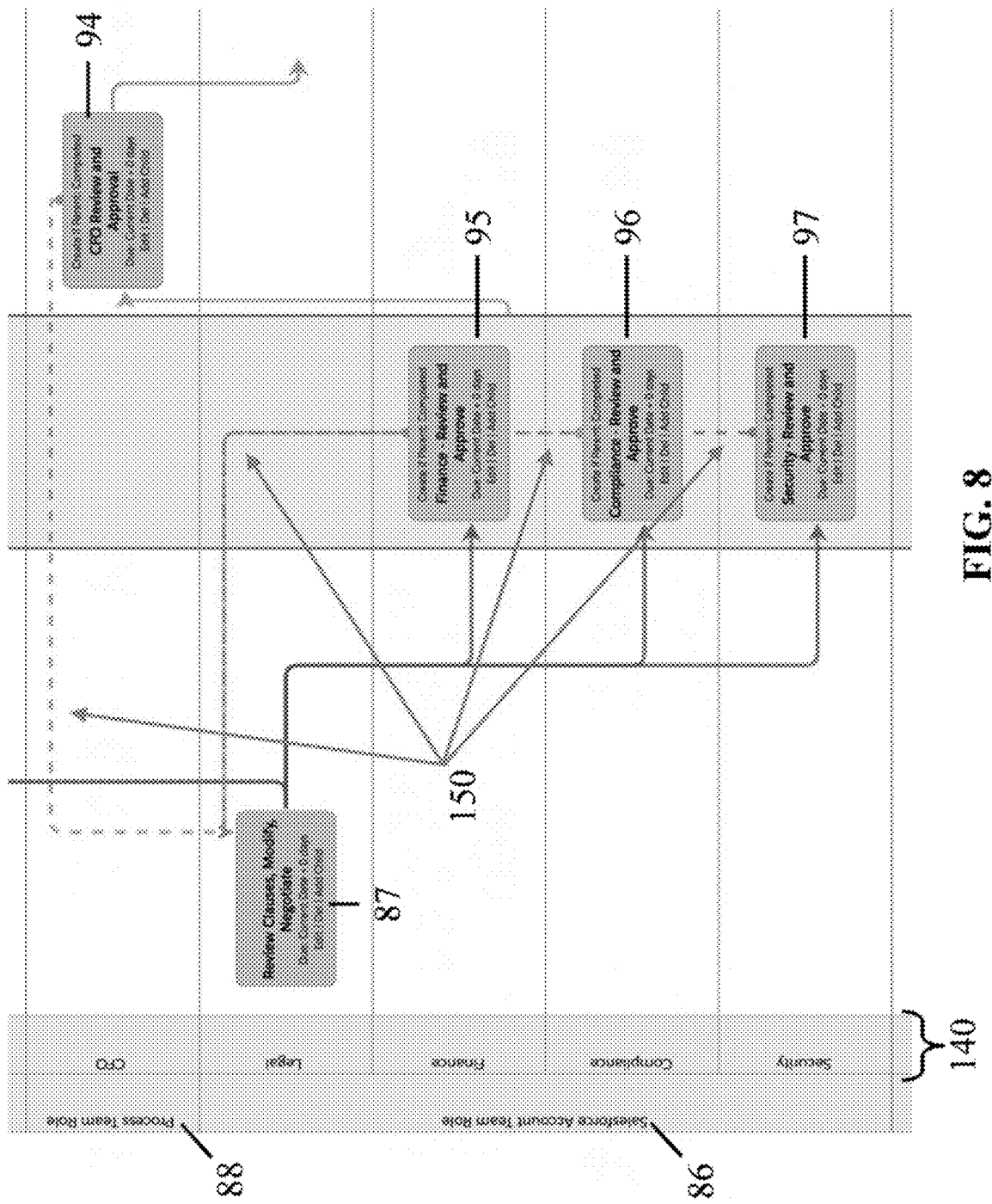
FIG. 8 illustrates another tabular display comprising end-to-end processes.
Figure 9:
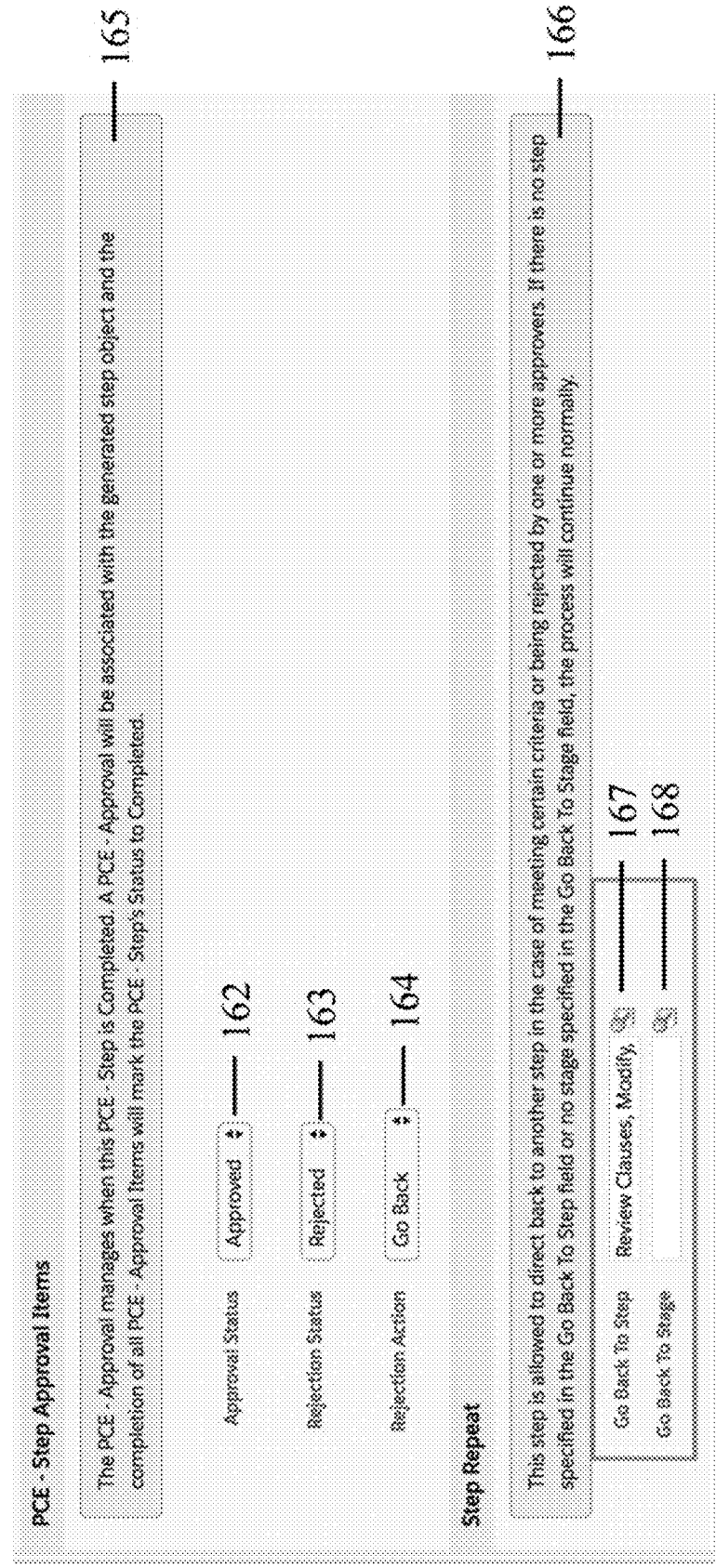
FIG. 9 illustrates an embodiment comprising looping or repeating steps or tasks.

Referring now to FIGS. 8-9, certain steps or tasks, or in some embodiments groups of steps or tasks may be sequenced or "looped" together. The table display of FIG. 8 depicts the loops with dashed lines 150. Here, a step 87 or series of steps 95, 96, 97 may repeat or loop automatically if a final step (such as an approval 94) is not met. In assigning steps or tasks, each step in a sequence may repeat within a loop, or alternatively multiple steps may repeat within a loop before any following steps can be performed. A simple loop is depicted in FIG. 8. FIG. 9 illustrates an interface 160 for establishing criteria for a loop, whereby the administrator or other user selects the "go back to step" 167 or "go back to stage" 168 pick list if a repetition is contemplated. The interface 160 may include selections or criteria to continue or proceed past the loop, for example by rejecting 163 or approving 162 as a conditional step. Other actions 164 may be selected if the step is rejected.

Figure 10:
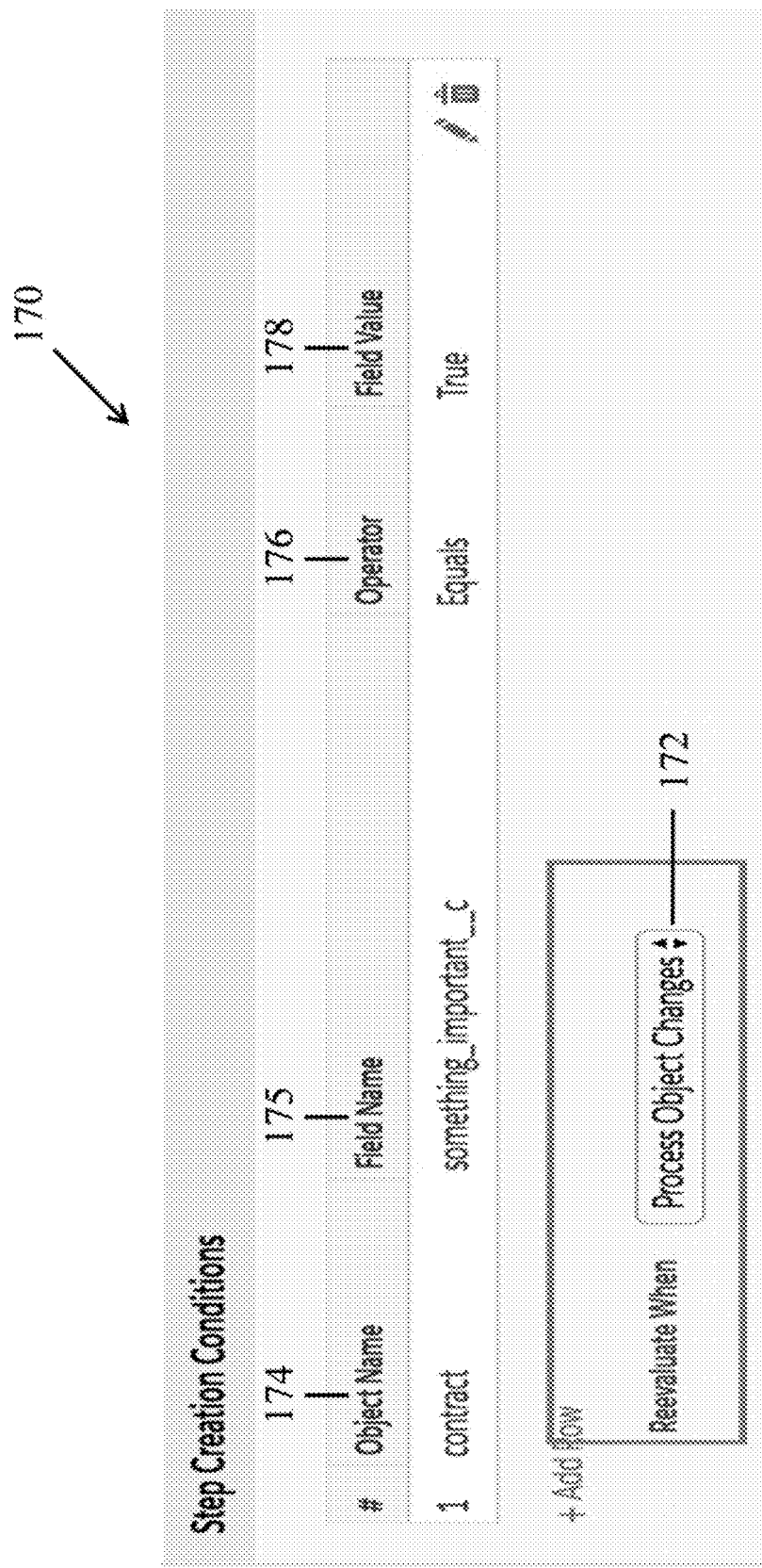
FIG. 10 illustrates another embodiment comprising conditional steps or tasks.

Users may wish to periodically evaluate conditions or assign new conditions to a task or set of tasks. This embodiment is shown in FIG. 10, wherein an interface 170 permits a user to select when a reevaluation should occur. The reevaluation selection 172 also permits the user to set a condition upon which the reevaluation will occur. For example, reevaluation may be selected to occur when a process object changes, or when an event occurs. As described above, the user may link objects and fields by inputting the Object Name 174, Field Name 175, Operator 176 and/or Field Value 178 using this interface 170.

Figure 11:
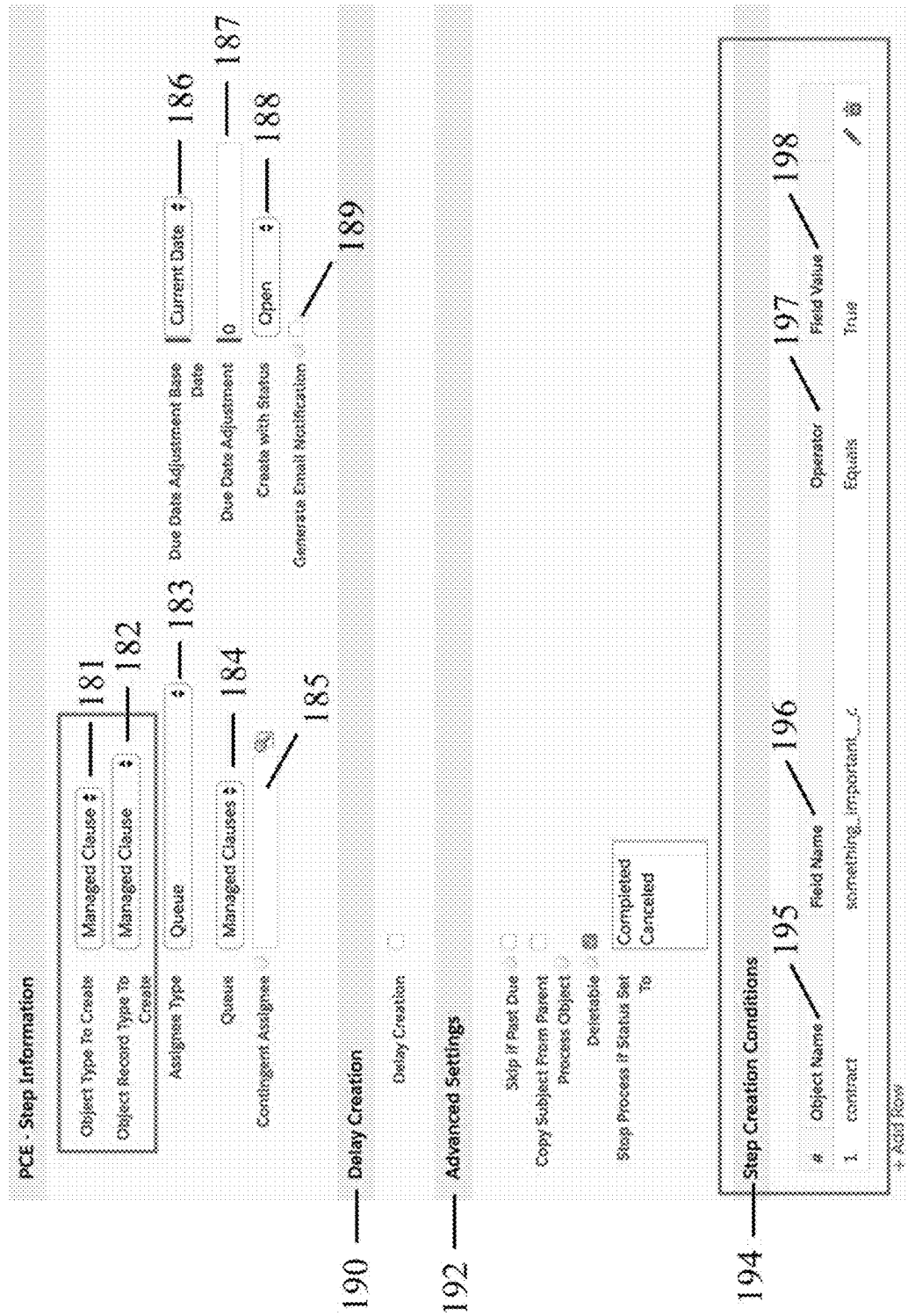
FIG. 11 illustrates yet another embodiment for managing conditions.
Figure 12:
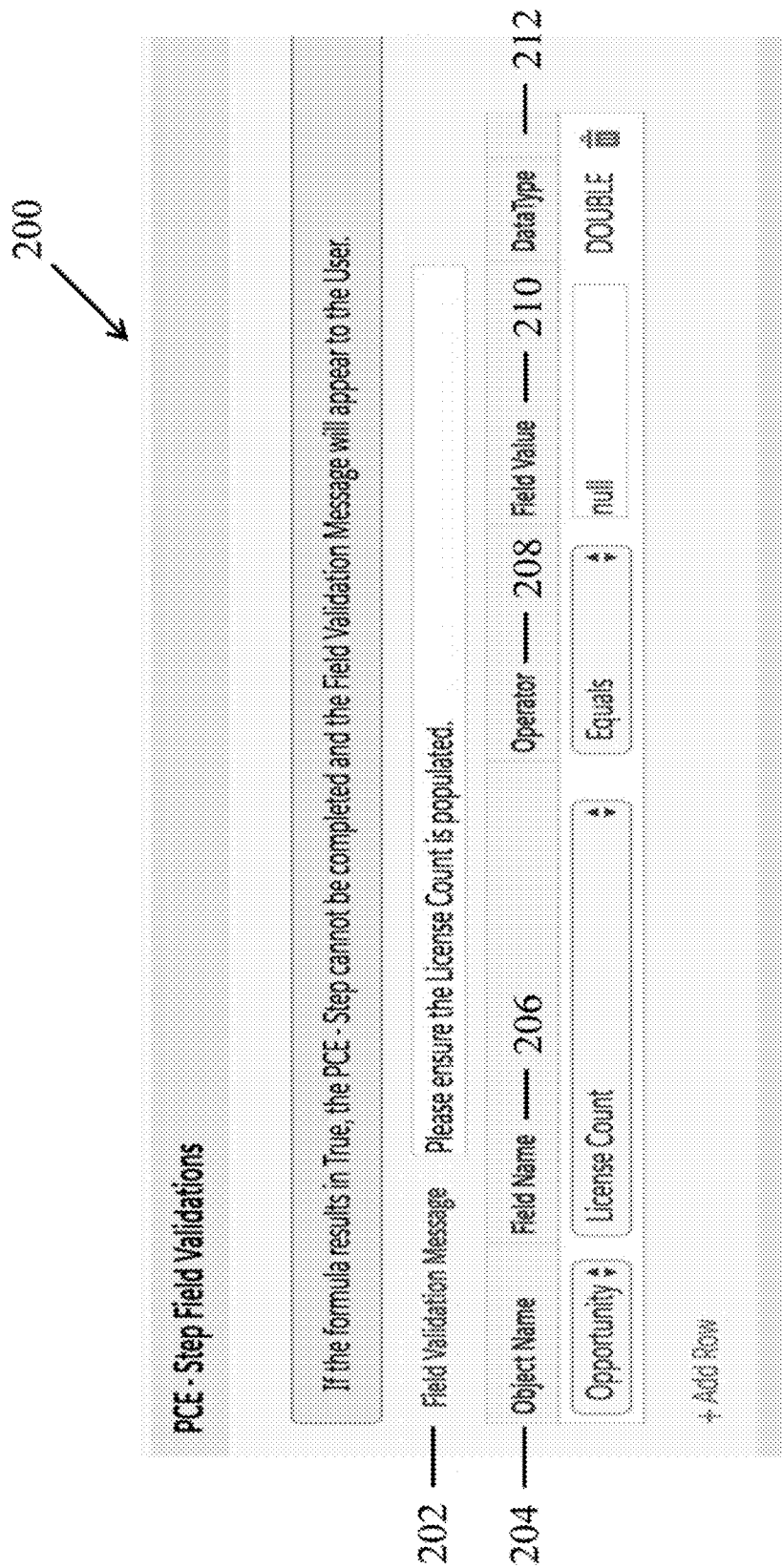
FIG. 12 illustrates a rule or validation process for a specific step or task in accordance with embodiments of the present disclosure.

In FIG. 11, certain conditions may arise within a record and cause additional steps or tasks to be created. For example, if a contract or contract clause contains declarative conditions, these may invoke new clauses to be added. The new clauses often will require new tasks or steps to be inserted into the process. The interface 180 shown in FIG. 11 may permit a user to select an Object Type to Create 181 and/or Object Record Type to Create 182 one or more conditions associated therewith. The Assignee Type 183 may be selected, such as the different assignees shown in FIGS. 5 and 8. A contingent Assignee 185 may also be selected. The user may select a Due Date Adjustment Base Date 186 and Due Date Adjustment 187 (for example, the number of days to adjust the due date). Status 188 may be selected and an email notification generated 189 once the task is completed or the due date arrives. The user may delay creation 190 and input advanced settings 192 as shown in FIG. 11. Object Name 195, Field Name 196, Operator 197 and/or Field Value 198 may also be inputted and/or linked to the Step Creation Conditions 194.

Additional approvals may also be required. The administrator or other user preferably has the option to select a repeat or loop process until the tasks are satisfactorily completed, or may select to end the process at a certain time, event or condition. Other settings are shown in relation to FIG. 11 and considered within the scope of the present disclosure.

In certain embodiments, a single or series of validations may be useful. Custom validations can be created by a user, as shown in the interface 200 of FIG. 12, for a particular step or task to continue. Here, the user may enter the Object Name 204, Field Name 206, Operator 208, Field Value 210 and/or Data Type 212 from a picklist, for example. A Field Validation Message 202 may also be inputted by the user using this interface 200. In preferred embodiments, until the validation occurs, the next step cannot be taken. In certain embodiments, the validation "gating" process occurs automatically upon creation of the validation step.

In other embodiments, a new file type may be generated, which in turn prompts a new step or series of steps that should logically follow. In these embodiments, the user may be presented with the option to condition or trigger the new steps or series of steps to occur if a new event is realized during the completion of the originally assigned tasks. New step names and descriptions would then be created, either manually or automatically, based upon the triggering event or condition.

According to embodiments, an administrator or other user may communicate with other users by email correspondence or through other messaging. In one embodiment, the system is specifically configured to watch for completion of steps or tasks and notify the users impacted by the change in status. For example, a user may receive a communication that their step or task is ready to be performed based upon the completion of the preceding task by a different user. Communications may be routed through, for example, Salesforce or equivalent CRM.

In embodiments, certain aspects of the system described herein may be configured to act as an intermediary application or bridge. For example, aspects of the system may be configured to communicate with a CRM system and one or more third party applications, modules or bots, wherein the system listens for custom events or conditions and may (a) report status changes to the third party, or (b) initiate or continue actions as customized by the third party. In this manner, the system may serve as a link between a CRM, such as Salesforce, and another application, module or bot.

Figure 13:
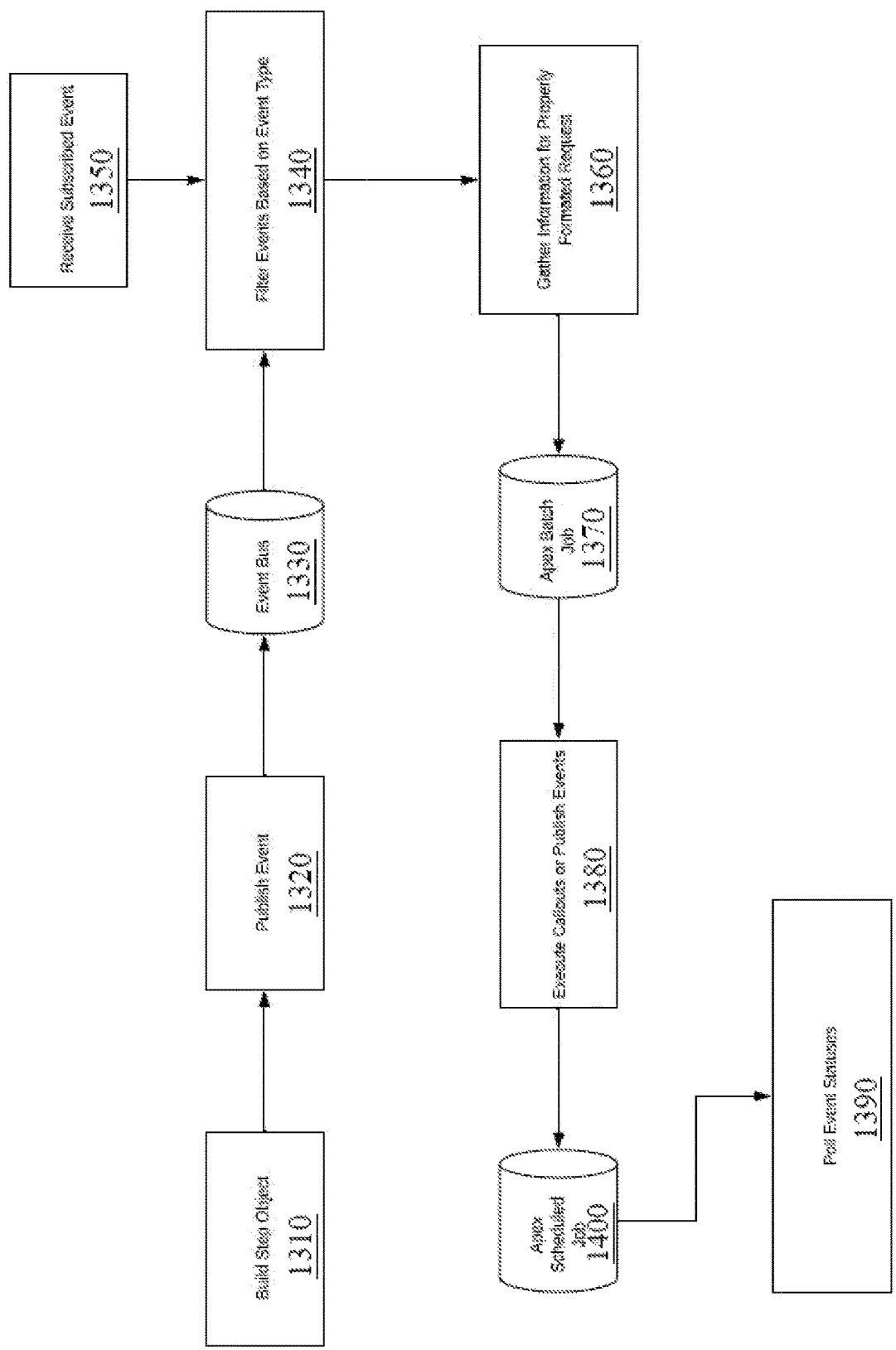
FIG. 13 illustrates another process for establishing event requests and polling event status in accordance with embodiments of the present disclosure.

Referring now to FIG. 13, a flow chart diagram is shown illustrating the configuration of the system as an intermediary application. In embodiments, a user and/or administrator may be directed to complete one or more steps or events as shown in FIG. 13, including Building a Step Object 1310. This step may trigger execution of a Step Object creation routine, which may occur autonomously or semi-autonomously. More details regarding the process of Building a Step Object 1310 are provided above. Once the Building a Step Object 1310 step is completed, the next step is to Publish an Event 1320, which may be published through communication(s) with an Event Bus 1330. The publishing of an event preferably occurs automatically, may occur simultaneously with another step, and multiple events and/or conditions may be published and routed through the Event Bus 1330. The system is preferably configured to Filter Events Based on Event Type 1340, such that any published events accessible via the Event Bus 1330 may be queried, searched, filtered, identified and selected based on a user's criteria. Once filtered, data requests may be queued in the system.

In this embodiment, the system may Receive a Subscribed Event 1350 message, which may result in the system filtering events on the Event Bus 1330 in connection with the subscribed event(s). The subscribed event message may be received from a third party application, module or bot. The system may receive the message and, if desired, Gather Information for a Properly Formatted Request 1360, in part to ensure that the system polls the correct events or event types associated with the desired activities and is formatted to listen for the appropriate event or event types subscribed via the Receive a Subscribed Event 1350 message. Once formatted, the Batch Job 1370 may be executed by the system.

Next, the system may process a Batch Job 1370, which may result in the creation of one or more records and event instances. The processing of a Batch Job 1370 in turn leads to another step, wherein the system Executes Callouts or Published Events 1380 associated with the request. Polling jobs may be scheduled for polling event instances during this step. Once executed, a Schedule Job 1400 may be processed and events polled and updated. The user or administrator may schedule one-time or periodic polling as prompted by the system (i.e., Poll Event Statuses 1390). The polling of events and event instances may occur autonomously. The status obtained from the polling may then be communicated to the user, administrator or third party, per the request. If requested, the status will be updated to reflect any changes while the events or event instances remain open.

In other embodiments, the system is configured to allow a proxy or "twin" of a custom object (i.e., a step object or task) to be created and linked to the custom object. The proxy or "twin" may be monitored and displayed to a user or administrator as the actual custom object is modified and/or event instances occur relating to the actual custom object. The flow of the proxy may be easily tracked in, by way of example, a consolidated data table. The ability to monitor one or more proxies created within the system further enhances a user's ability to forecast time for tasks to be completed and/or approved, manage resources for critical tasks and time-sensitive events, and ensure that all associated activities are completed and objectives achieved within the allotted timeframe.

Methods of assigning and managing tasks or steps according to embodiments will now be described. In one aspect of the disclosure, the user is provided with a system for identifying tasks for completion. The user may select any one or more of the identified tasks and assign those tasks to one or more users. Child tasks may be associated with parent or primary tasks, and loops created to the extent desired. For example, an approval may be required at one or multiple stages of the managed task completion cycle, and a loop created where further approval is desired. In certain embodiments, the approval may be a step, which in turn may initiate additional steps or tasks for further completion. Conditions may also be established for certain tasks or subtasks to be performed. For example, a pre-condition may be established for a certain step or task to be initiated and/or completed. Once the tasks are identified and assigned, the system may generate one or more displays for monitoring the status of the user activity and/or reviewing the relationships between tasks assigned. As new steps or tasks are identified, the user(s) may incorporate the same.

The systems may include one or more processors, memory, and modules for facilitating the methods described herein. In this manner, any CRM or equivalent system may employ the methods described herein. The method of using the system in this manner comprises several steps, which permit the user to efficiently manage the checklist and complete tasks assigned to users in a timely manner without loss of activity or undue delay.

Certain embodiments of the present disclosure have been described in connection with various examples of records. It should be noted, however, that embodiments of the present disclosure are not limited to specific objects, records or their associated tasks and activities. In particular, embodiments of the present disclosure may be applied to any database or other data source. For instance, while embodiments of the present invention may be described with respect to Salesforce or an equivalent CRM system, other applicability is contemplated. More particularly, the aspects of the invention described herein may apply to other records, including business, sales, product, inventory, shipping, billing, delivery, processing, manufacturing, supply, and other records, regardless of the repository where the records are stored. It should be understood that the embodiments described herein relative to a CRM data repository is for illustrative purposes only and should not be construed as limiting the present disclosure.

In embodiments, the systems and methods described above may further comprise an application or be provided via one or several modules. In one embodiment, the application/modules are designed to operate on a mobile device or mobile computer, and assist a user with managing organizational documents and associated data organization. In one embodiment, the application/modules may comprise one or more data sets, tables or databases, including one or more relational databases. In one embodiment, the application includes time and/or content-specific notifications. In embodiments, the application/modules further permit a user to monitor and locate the status of checklists or processes assigned, in many instances automatically.

According to this embodiment, the application preferably is configured to run on a computer server or similar computational machinery. The application may also be configured to provide alerts. Alerts may be provided via the application (e.g., notification upon login, push notification), email, messaging, or any other suitable method of communication to the user. Alerts may be defined for certain conditions, for example, a change in state or status of a certain object or record. In embodiments, alerts may be configured due to the expiration of a set time, or a combination of expiration of time without an action taken by one or more users. Alternately, alerts may be provided for continued modification or approval of a completed step or task. In another example, an alert may indicate a recommended course of action. For example, the alert may recommend that steps for completing a clause not already contained within a contract record be incorporated, or that specific data be modified to comply with predetermined rules established by one or more users. Alerts may also be configured to initiate messaging to one or more users of the system, and may be indicated to a user via one or more of the interfaces described herein.

In this embodiment, the application is advantageously configured to receive and send information by, for example, a user's mobile device. The application is also preferably configured to generate a plurality of reports, graphs, status bars, etc. Such reports may be used by the user to improve strategy and decision-making or to facilitate reconciliation of discrepancies in the system, or to enhance the scheduling, assignment, completion and approval of steps or tasks within the organization (or between different organizations).

In one embodiment, the application comprises one or more user interfaces and displays, such as the displays depicted in the drawing Figures appended hereto. The application may be stored or operated on a computing environment, wherein the systems, devices, servers, modules, etc. may execute. The computing environment preferably includes one or more user computers. The computers may be general purpose personal computers (including, merely by way of example, personal computers, and/or laptop computers running various versions of Microsoft Corp.'s Windows and/or Apple Corp.'s Macintosh operating systems) and/or workstation computers running any of a variety of commercially-available UNIX or UNIX-like operating systems. These user computers may also have any of a variety of applications, including for example, database client and/or server applications, and web browser applications. Alternatively, the user computers may be any other electronic device, such as a thin-client computer, Internet-enabled mobile telephone, and/or personal digital assistant, capable of communicating via a network and/or displaying and navigating web pages or other types of electronic documents. Any number of user computers may be supported.

The computing environment described according to this embodiment preferably includes at least one network. The network can be any type of network familiar to those skilled in the art that can support data communications using any of a variety of commercially-available protocols, including without limitation SIP, TCP/IP, SNA, IPX, AppleTalk, and the like. Merely by way of example, the network may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system in varying embodiments may also include one or more server computers. One server may be a web server, which may be used to process requests for web pages or other electronic documents from user computers. The web server can be running an operating system including any of those discussed above, as well as any commercially-available server operating systems. The web server can also run a variety of server applications, including SIP servers, HTTP servers, FTP servers, CGI servers, database servers, Java servers, and the like. In some instances, the web server may publish operations available operations as one or more web services.

According to certain embodiments, the computing environment may also include one or more file and or/application servers, which can, in addition to an operating system, include one or more applications accessible by a client running on one or more of the user computers. The server(s) may be one or more general purpose computers capable of executing programs or scripts in response to the user computers. As one example, the server may execute one or more web applications. The web application may be implemented as one or more scripts or programs written in any programming language, such as Java™, C, C#, or C++, and/or any scripting language, such as Perl, Python, or TCL, as well as combinations of any programming/scripting languages. The application server(s) may also include database servers, including without limitation those commercially available from Oracle, Microsoft, Sybase™, IBM™ and the like, which can process requests from database clients running on a user computer.

In embodiments, the web pages created by the application server may be forwarded to a user computer via a web server. Similarly, the web server may be able to receive web page requests, web services invocations, and/or input data from a user computer and can forward the web page requests and/or input data to the web application server. In further embodiments, the server may function as a file server. Although the foregoing generally describes a separate web server and file/application server, those skilled in the art will recognize that the functions described with respect to servers may be performed by a single server and/or a plurality of specialized servers, depending on implementation-specific needs and parameters. The computer systems, file server and/or application server may function as an active host and/or a standby host.

In embodiments, the computing environment may also include a database. The database may reside in a variety of locations. By way of example, database may reside on a storage medium local to (and/or resident in) one or more of the computers. Alternatively, it may be remote from any or all of the computers, and in communication (e.g., via the network) with one or more of these. In a particular embodiment, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, which is adapted to store, update, and retrieve data in response to SQL-formatted commands. In embodiments, data may be securely shared utilizing a distributed ledger architecture or private blockchain, which may be securely accessed by users and/or third parties.

The computer system may also comprise software elements, including but not limited to application code, within a working memory, including an operating system and/or other code. It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

According to one embodiment, the server may include one or more components that may represent separate computer systems or electrical components or may include software executed on a computer system. These components include a load balancer, one or more web servers, a database server, and/or a database. The load balancer is operable to receive a communication from the mobile device and can determine to which web server to send the communication. Thus, the load balancer can manage, based on the usage metrics of the web servers, which web server will receive incoming communications. Once a communication session is assigned to a web server, the load balancer may not receive further communications. However, the load balancer may be able to redistribute load amongst the web servers if one or more web servers become overloaded.

In embodiments, one or more web servers are operable to provide web services to the user devices. In embodiments, the web server receives data or requests for data and communicates with the database server to store or retrieve the data. As such, the web server functions as the intermediary to put the data in the database into a usable form for the user devices. There may be more or fewer web servers, as desired by the operator.

In this embodiment, a database server is any hardware and/or software operable to communicate with the database and to manage the data within the database. Database servers, for example, SQL server, are well known in the art and will not be explained further herein. The database can be any storage mechanism, whether hardware and/or software, for storing and retrieving data. The database can be as described further herein.

In embodiments, components of the web server can include hardware and/or software components. In embodiments, the web server includes a discovery web service. The discovery web service is operable to receive a first request from a user device. The first request is mapped to a predetermined web server. Thus, each mobile device is associated with a predetermined one or more web servers associated with the enterprise or organization of the user and/or user device.

According to one embodiment, a discovery web service extracts information from the request, e.g., the user's name, a user's mobile device identifier (e.g., a cell phone number, an Internet Protocol (IP) address, etc.), or some other identifying information. This information is compared to a stored table or other data to match the user device to an assigned web server. If the mobile device is assigned to the web server, the request is passed to the device interface. However, if the mobile device is mapped to another web server, the discovery web service can redirect the request and the mobile device by replying to the request with a redirect message that includes the uniform resource locator (URL) for the other web server. In this way, the system is expandable, as new web servers can be easily added as new enterprises use the system.

In the foregoing description, for the purposes of illustration, systems and methods were described in a particular order. It should be appreciated that in alternate embodiments, the methods may be performed in a different order than that described. It should also be appreciated that the methods described above may be performed by hardware components or may be embodied in sequences of executable instructions on machine-readable media, and which cause a machine, such as a general-purpose or special-purpose processor or logic circuits programmed with the instructions to perform the methods. These machine-executable instructions may be stored on one or more machine-readable mediums.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While illustrative embodiments of the invention have been described in detail herein, it is to be understood that the inventive concepts may be otherwise variously embodied and employed, and that the appended claims are intended to be construed to include such variations, except as limited by the prior art.

The invention claimed is:

1. A method of assigning, managing and tracking completion of tasks associated with a record among multiple members of a common organization through a customer relationship management system and updating a data source associated with the customer relationship management system, comprising the steps of:

selecting a record stored in the customer relationship management system;

providing an assignment interface to a first member of the organization for assigning and managing one or more tasks for modifying the record;

creating one or more tasks to modify the record using the assignment interface;

assigning the one or more tasks to at least one second member of the organization;

associating one or more subtasks for the assigned one or more tasks;

assigning the one or more subtasks to at least one third member of the organization;

linking the assigned one or more tasks and one or more subtasks to the record to autonomously and dynamically modify the record as each of the one or more tasks and one or more subtasks are approved and completed;

communicating the assigned one or more tasks and one or more subtasks to the at least one second and at least one third members of the organization;

assigning an approval for completion of the task and one or more subtasks to at least one fourth member of the organization;

providing an overlay interface comprising a visual display of the assignment, approval and completion status of each assigned task and one or more subtasks, and displaying indicia representing the state of each assigned task and one or more subtasks via an overlay interface;

communicating the completion of each of the one or more subtasks associated with the assigned task to the first member of the organization;

soliciting an approval or rejection of the at least one task from the at least one fourth member of the organization; and reporting the approval or rejection of the at least one task to the at least one second member of the organization;

wherein the linking of the assigned one or more tasks and one or more subtasks to the record permit the record to be autonomously updated in the customer relationship management system upon completion of one or more subtasks, approval of an assigned tasks or rejection of an assigned task;

wherein each of the steps of selecting a record, providing an assignment interface, creating, assigning one or more tasks, associating one or more subtasks, assigning one or more subtasks, linking, assigning an approval, providing an overlay interface, communicating the completion, soliciting an approval or rejection and reporting the approval or rejection are performed using a non-transitory computer readable medium having recorded thereon a computer program operating on a computational machine.

2. The method according to claim 1 further comprising the step of creating a checklist of subtasks associated with the assigned task, wherein the subtasks may be visually represented to the at least one member via the overlay interface and in the customer relationship management record dynamically, and wherein the status of each of the subtasks may be visually represented to the at least one fourth member assigned to approve the completion of the task via the overlay interface.

3. The method according to claim 1, wherein the steps of creating and assigning none or more tasks comprise building one or more objects to associate with at least one of the one or more tasks, wherein each of the one or more objects are linked to the record in the customer relationship management system, and wherein each of the linked objects are configured to be modified and updated as tasks or associated subtasks are completed or approved.

4. The method according to claim 3, wherein at least one of the one or more objects is identified as a parent object, and at least another of the one or more objects is identified as a child object, wherein the child object is associated with the parent object, and wherein the child object is required to be updated and identified as completed prior to the parent object completion.

5. The method according to claim 4, wherein the one or more objects are sequenced in a desired order, and wherein the completion or approval of a certain of the one or more objects initiates another of the one or more objects.

6. The method according to claim 4, wherein at least one of the parent objects is repeated if any one of the child objects associated with the at least on of the parent objects is modified.

7. The method according to claim 1 further comprising the steps of:
creating an alert associated with an event instance for the assigned task; and
providing messaging to at least one first member based upon the occurrence of the event instance associated with the created alert.

8. The method according to claim 1, wherein the assigned task, subtasks and approval steps are visually represented by one or more of a task status, a subtask status, an approval status, an assigned member's role, a role within an organization associated with the customer relationship management system, and a relationship between an assigned task and subtask.

9. The method according to claim 3 further comprising the step of generating a proxy for at least one of the one or more objects, wherein the generated proxy is linked to at least one of the one or more step objects and stored in a separate data table.

10. The method according to claim 1, wherein the record is comprised of a contract or a clause within a contract stored in the customer relationship management system.

11. The method according to claim 1, wherein the one or more subtasks are assigned to be completed sequentially, and wherein approval for each of the one or more subtasks must be obtained before completing sequential subtasks of the one or more subtasks.

12. The method according to claim 1, wherein the one or more subtasks are assigned to be completed in parallel, and wherein approval for each of the one or more subtasks is obtained independently of the status of the other one or more subtasks.

* * * * *